United States Patent
Coing et al.

(10) Patent No.: US 11,110,792 B2
(45) Date of Patent: Sep. 7, 2021

(54) PLASTIC VEHICLE TANK WITH CONNECTING ELEMENT HAVING AN IMPROVED BREAKING EFFECT

(71) Applicant: Plastic Omnium Advanced Innovation and Research, Brussels (BE)

(72) Inventors: Jean-Francois Coing, Clairoix (FR); Philippe Convain, Saint-Jean-Aux-Boix (FR); Laurent Duez, Uccle (BE); Pierre De Keyzer, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 164 days.

(21) Appl. No.: 16/467,804

(22) PCT Filed: Dec. 22, 2017

(86) PCT No.: PCT/EP2017/084558
§ 371 (c)(1),
(2) Date: Jun. 7, 2019

(87) PCT Pub. No.: WO2018/115523
PCT Pub. Date: Jun. 28, 2018

(65) Prior Publication Data
US 2020/0346539 A1     Nov. 5, 2020

(30) Foreign Application Priority Data
Dec. 23, 2016 (EP) ..................... 16306812

(51) Int. Cl.
*B60K 15/03* (2006.01)

(52) U.S. Cl.
CPC ................. *B60K 15/03177* (2013.01); *B60K 2015/03493* (2013.01)

(58) Field of Classification Search
CPC .... B60K 15/03177; B60K 2015/03493; B60K 2015/03032; B65D 23/001; B65D 90/08; F17C 1/16
(Continued)

(56) References Cited

U.S. PATENT DOCUMENTS 6,398,055 B1 * 6/2002 Ostholt ..................... F17C 1/16
                                                  220/23.4
9,090,156 B2 * 7/2015 Pozgainer .............. B65D 90/08
(Continued)

FOREIGN PATENT DOCUMENTS

DE   10 2006 018 639 A1   10/2007
DE   10 2012 019 334 A1    4/2014
(Continued)

OTHER PUBLICATIONS

International Search Report dated May 15, 2018 in PCT/EP2017//084558 filed on Dec. 22, 2017.

*Primary Examiner* — King M Chu
(74) *Attorney, Agent, or Firm* — Oblon, McClelland, Maier & Neustadt, L.L.P.

(57) ABSTRACT

A plastic vehicle tank defining an interior volume provided to contain liquid and comprising: a. an upper wall; b. a lower wall; c. at least one connecting element joining the upper wall to the lower wall of the plastic vehicle tank, said at least one connecting element being located inside the interior volume provided to contain a liquid, and comprising a structure made of continuous fibers embedded in a matrix.

18 Claims, 3 Drawing Sheets

(58) Field of Classification Search
USPC ................................................ 220/562, 653
See application file for complete search history.

(56) References Cited

U.S. PATENT DOCUMENTS

| | | |
|---|---|---|
| 2009/0145909 A1 | 6/2009 | Hausberger |
| 2009/0314785 A1* | 12/2009 | Cronin ................. B65D 90/022 220/590 |
| 2014/0158696 A1* | 6/2014 | Criel .................... B60K 15/067 220/562 |
| 2015/0232226 A1* | 8/2015 | Heidemeyer .... B60K 15/03177 220/652 |
| 2016/0059477 A1 | 3/2016 | Karsch |
| 2017/0217306 A1 | 8/2017 | Heidemeyer et al. |

FOREIGN PATENT DOCUMENTS

| | | |
|---|---|---|
| DE | 10 2013 004 931 A1 | 9/2014 |
| EP | 1 773 570 B1 | 1/2009 |
| WO | WO 2012/139962 A1 | 10/2012 |
| WO | WO 2015/059249 A1 | 4/2015 |

\* cited by examiner

PLASTIC VEHICLE TANK WITH CONNECTING ELEMENT HAVING AN IMPROVED BREAKING EFFECT

This application is a National Stage (371) of application PCT/EP2017/084558 filed on Dec. 22, 2017, which claims priority to EP16306812.5 filed on 23 Dec. 2016.

Plastic vehicle tanks according to the invention can be fuel tanks, tanks for storing aqueous urea for selective catalytic reduction of nitrogen oxides in exhaust gases or, more generally, other tanks for storing operating fluids, for example. In the case of plastic vehicle tanks known from the prior art, a connecting element is arranged in the interior of the tank in order to reinforce it, wherein the connecting element connects an upper wall to a lower wall of the tank. The connecting element and the respective tank walls are connected materially by adhesive bonding or welding, for example. However, positive connection by riveting, screwing or by means of a bayonet joint is also possible. Most of such connecting elements known in the prior art comprise breaking points, at which the connecting element suffers structural failure in the event of impact loading of the plastic vehicle tank, ensuring that the walls of the plastic vehicle tank remain undamaged.

Various shapes of connecting element exist in order to compensate forces that the tank endures during ageing such as stresses for example. The patent application WO2012139962 (A1), discloses a connecting element comprising a hollow pillar with specific ratio between the diameter of its cross section at its ends and the diameter of its cross section at one intermediate portion in order to ensure a convenient breaking The patent application WO2015059249 (A1), discloses a connecting element comprising a first portion made of a first material weldable to the plastic material of the tank; and a second portion made of a second material having a tensile stress at break which is three to nine times larger than the tensile stress at yield of the first material. The second portion comprises at least one through-hole, and the first material extends in said at least one through-hole and at opposite sides of said second portion adjacent said at least one through-hole two portion made of different material improving the resistance to permanent stresses that may occur in the tank.

It is an object of the present invention to provide a plastic vehicle tank comprising a connecting element which presents an improved breaking effect. This object is achieved by a plastic vehicle tank defining an interior volume provided to contain a liquid and comprising:
- an upper wall;
- a lower second wall; and
- at least one connecting element joining the upper wall to the lower wall of the plastic vehicle tank, said at least one connecting element being located inside the interior volume provided to contain a liquid, and comprising a structure made of continuous fibers embedded in a matrix.

A plastic vehicle tank according to the invention comprises at least one connecting element, which is arranged between two tank walls of the plastic vehicle tank and connect the tank walls inside the interior volume of the plastic vehicle tank. The plastic vehicle tank according to the invention, defines an interior volume in which is stored a liquid such as fuel, water or an aqueous urea solution, preferably a fuel. The connecting element is located inside the interior volume in which is stored a fluid.

Thus, the at least one connecting element can be in contact with the liquid stored in the plastic vehicle tank depending on the level of the liquid.

The plastic vehicle tank according to the invention is such that the tank walls are connected to one another via the at least one connecting element which comprises a structure made of continuous fibers embedded in a matrix. Such connecting element presents the advantage to have no predetermined breaking point but a structure which endures either deformation or breaking when the plastic vehicle tank is subject to impact loading or stress.

Thus, the continuous fibers can be easily incorporated in the matrix via a manufacturing process such as injection moulding, overmoulding or welding, etc.

In a preferred embodiment, the matrix of the structure is in thermoplastic material.

Thus, the shaping of the matrix during a manufacturing process is facilitated because of the properties of thermoplastic material at high temperatures which enable the deformation and so the shape of several forms or design. Also, after the shaping of the thermoplastic material, the cooling enables to maintain the required design or form with no difficulties.

According to preferred embodiment of the invention, the continuous fibers are glass fibers.

Glass fibers is a type of fiber that is cost-effective for the manufacturing of the at least one connecting element and the plastic vehicle tank.

The invention is also adapted for carbon, polymer fibers or any material that can compose continuous fibers.

The structure according to the invention comprises continuous fibers oriented either unidirectionally in the matrix, in other words in a single direction in the matrix, or in at least a first direction and a second direction in the matrix. The end faces of the connecting element are made of a material compatible with the plastic vehicle tank. The end faces ensure the adhesion of the connecting element with the tank. By the expression "materials compatible", we intend to means that the two materials could be physically and/or chemically bonded.

According to an embodiment of the invention, the continuous fibers of the structure are oriented in a single direction in the matrix.

In the case wherein the continuous fibers are oriented in a single direction, the structure has higher stiffness in the orientation of the fibers. However, the structure is not reinforced in the transversal direction of the orientation of the fibers. Therefore the structure resists more against stress directed in the orientation of the fibers compared to a stress directed in the transversal direction. In a particular embodiment, the fibers are oriented in the direction perpendicular to the upper wall and to the lower second wall of the plastic vehicle tank.

According to an embodiment of the invention, the continuous fibers of the structure are oriented in at least a first direction and a second direction. The first and second directions are separated by an angle between 30° and 90°.

In a preferred embodiment, the angle between the at least first and second directions is between 45° and 90°.

According to another embodiment of the invention, the continuous fibers oriented in the first direction in the matrix are of the same chemical composition as the continuous fibers oriented in the second direction.

According to another embodiment of the invention, the continuous fibers oriented in the first direction in the matrix are of the same nature as the continuous fibers in the second direction in the matrix.

According to a further embodiment of the invention, the continuous fibers oriented in the first direction in the matrix are of different chemical compositions than the continuous fibers oriented in the second direction in the matrix.

According to a further embodiment of the invention, the continuous fibers oriented in the first direction in the matrix are of different nature than the continuous fibers oriented in the second direction in the matrix.

Thus, the structure is able to have different mechanical properties depending on the directions.

For example, a structure with continuous carbon fibers oriented in a first direction and the same amount of continuous glass fibers oriented in a second direction has a tensile Young modulus higher in the first direction due to the carbon mechanical properties.

According to a preferred embodiment, the structure of the at least one connecting element has a tensile Young and/or a flexural modulus in at least a first direction that is 1.1 to 5 times higher than the tensile Young and/or flexural modulus of the structure in at least a second direction.

Thus, the structure made of continuous fibers has anisotropic mechanical properties. By anisotropic mechanical properties, it has to be understood the stress at break, the strain at break or the flexural modulus.

The amount of fibers oriented in at least a first direction can be different than the amount of fibers oriented in at least a second direction.

According to an embodiment of the invention, the continuous fibers are woven.

In a preferred embodiment, the weaving of the fibers is unbalanced. Thus, the structure is stiffer and resistant against impacts or stress in the direction where the quantity of fibers is more important compared to the other direction where the quantity of the continuous fibers is less important. The structure presents therefore anisotropic properties. In other words, the structure will deform or break more easily in the direction where the quantity of the fibers is less important.

The orientation where there are less continuous fibers is the direction where the deformation or the breaking of the structure is expected during impact or stress. Inversely, the orientation where there are more continuous fibers is the orientation where the structure endures less deformation or breaking during impact or stress. Thus, the resistance of the structure is controlled with the orientation and the quantity of the continuous fibers inserted into the matrix of the structure.

Also, woven continuous fibers are easy to be manufactured at high volume and at reduced costs.

According to another embodiment, the structure is made of at least two layers of continuous fibers superposed in at least one direction in the matrix.

Thus, the overlaying of the continuous fibers is easier to be implemented than a weaving of the continuous fibers. Also, it can be easily manufactured with different directions and angles.

So, the invention enables a control of the tensile Young modulus of the structure in several and/or transverse directions.

The at least one connecting element can have either by the structure of the weaving of continuous fibers or either by the orientation of the continuous fibers anisotropic mechanical properties. For example a connecting element with most of the continuous fibers oriented in a single direction will have high resistance for a load in the direction of the fibers and a low resistance for load in perpendicular direction of the fibers.

According to an embodiment, the matrix of the structure is made in the same material as the plastic vehicle tank.

Thus, the incorporation of the at least one connecting element into the plastic vehicle tank by manufacturing process is ensured. For example, the welding of the at least one connecting element in the plastic vehicle tank would be possible because the material of the at least one connecting element is the same as the plastic vehicle tank and so compatible.

In a preferred embodiment, the plastic vehicle tank and the at least one connecting element are in HDPE (high-density polyethylene).

The matrix with continuous fibers embedded may be in many forms; it is generally a sheet comprising continuous fibers, which continuous fibers may or may not be woven. When the length of the fibers used is several tens of millimeters, these fibers are referred to as continuous fibers or continuous filaments.

These continuous fibers may be based on glass, on carbon, on a polymer (such as a polyamide, for example an aromatic polyamide such as an aramid), or may even be natural fibers such as hemp or sisal. They are preferably glass fibers (of E-glass, S-glass or other glass type).

The continuous fibers are preferably incorporable in a thermoplastic and therefore, generally, incorporable in polyolefins and, in particular, in HDPE. In order to obtain this incorporation, the fibers may be sized (surface-treated) with a compatibilizing substance such as a silane. A reactive HDPE-type binder may also be used. Within this context, reactive functional groups of maleic anhydride type may advantageously be used.

Plastic vehicle tanks are mainly manufactured in polyethylene material. Therefore, the compatibility of the structure and the at least one connecting element with the plastic vehicle tank is ensured.

The continuous fibers content in the reinforcement is comprised between 30% and 75% in weight.

In a preferred embodiment, the continuous fibers content is comprised between 45% and 55% in weight.

A thermoplastic is preferably melted around/in the bulk of the continuous fibers so as to form a homogeneous sheet/plate having thermoplastic on at least one portion of its surface so as to facilitate welding. In practice, this can be achieved by compression moulding, injection moulding, spray moulding, vacuum moulding or else calendering.

This reinforcement has a thickness of at least 1 mm, preferably at least 1.5 mm and at most 5 mm.

Thus, the connecting element has a thin configuration and so allows to limit the volume loss and the weight increase caused by the connecting element.

The matrix with continuous fibers embedded according to the invention presents also the advantage that any dimensioning of the matrix with continuous fibers is practicable by cutting. Thus, it allows an easy integration of the connecting element within the tank.

In some embodiments, the structure has a Z-shape profile, a L-shape profile, a U-shape profile, a cylindrical shape profile or a hemispherical shape profile.

Any other suitable shape profile determinable by the person skilled of the art may also be used.

In a particular embodiment, the structure comprises at least one bent portion. Thus, the mechanical resistance of the structure is higher in case of compression and/or flexion and/or torsion compared to a structure without a bent portion. Preferentially, the bent portion is aimed to get bent in a direction preferentially perpendicular to the upper lower walls of the plastic vehicle tank.

Thus, the structure according to the invention is easy to manufacture and the dimensioning is easy to adapt and integrate to the tank shape. Moreover limited tools are required for the cutting and/or the bending of the matrix with continuous fibers embedded.

The at least one connecting element according to the invention comprises spaced apart end faces composed of thermoplastic material compatible with that of the upper and lower walls of the tank, said structure extending between and connected to the end faces.

In other words, the end faces are made of thermoplastic material compatible with the one of the plastic vehicle tank walls. The end faces ensure the adhesion of the connecting element with the tank. Therefore the end faces are easily connected to the plastic vehicle tank, in particular may be welded to the tank wall of the plastic vehicle tank. By the expression "the end faces of the connecting element are made of a material compatible with the plastic vehicle tank", we intend to mean that the end faces of the connecting element are made of a material suitable to ensure the adhesion of the connecting element to the plastic vehicle tank, more particularly the end faces of the connecting element are made of a material suitable to be welded to the plastic vehicle tank.

Thus, the structure extends between the end faces and connects them.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are: random copolymers, linear block copolymers, other block copolymers and graft copolymers.

One polymer often employed is polyethylene. Excellent results have been obtained with high-density polyethylene (HDPE). Preferably, the tank also comprises a layer of a fuel-impermeable resin such as, for example, EVOH (a partially hydrolysed ethylene/vinyl acetate copolymer). Moreover, the connecting element according to the invention comprises a structure made of a matrix with continuous fibers embedded and which has a tensile Young modulus strictly greater than/superior in the direction of the fibers to the tensile young modulus of the end faces of the connecting element. Young modulus is known to define mechanical property of linear elastic solid materials. More precisely, it defines the relationship between stress (force per unit area) and strain (proportional deformation) in a material.

The tensile Young modulus is determined with a tensile test at ambient temperature and at a relative humidity of 50% in accordance with the ISO 527 requirement.

Thus, the structure is more rigid than the end faces of the connecting element.

In a preferred embodiment, the at least one connecting element comprises spaced apart end faces, and at least one of the tank walls comprises a recess for receiving one of the end faces of the connecting element. The recess acts as a guide member for the connecting element during the assembly of the connecting member into the tank. It makes easier the positioning of the end face onto the wall, the welding operation of the end face onto the wall and therefore the assembly.

More preferably, the recess is integrally made with at least one of the tank walls.

In a preferred embodiment, the at least one connecting element comprises spaced apart end faces, and the structure comprises a first extremity and a second extremity, each of said first and second extremities being encapsulated with the end faces of the connecting element, preferably the end faces of the connecting element being made by injection moulding of thermoplastic material.

For example, the structure is first positioned into a mold. Then the thermoplastic material is injected either along the complete length of the structure or locally at the extremities of the structure to form the end faces. The end faces are further welded to the respective tank walls.

In the case where the thermoplastic material is injected along the complete length of the structure, said structure is encapsulated or coated with the thermoplastic material. In other words, the thermoplastic material of the end faces of the connecting element surrounds entirely the structure. Thus, the fact that the structure is encapsulated or coated within the thermoplastic material allows avoiding any risk of fiber contamination from the matrix with continuous fibers embedded inside the tank.

In the case where the thermoplastic material is injected locally at the extremities of the structure, the extremities are encapsulated with the thermoplastic material of the end faces.

In a particular embodiment, the thermoplastic material of the end faces and the thermoplastic material of the matrix of the structure are compatible. Thus, the thermoplastic material of the end face surrounds in an irreversible way the structure by a strong chemical bonding.

In another particular embodiment, each of said first and second extremities comprises at least one orifice, the end faces being made of thermoplastic material, and said thermoplastic material passes through the at least one orifice. During the injection moulding, the thermoplastic material of the end faces passes through the at least one orifice and forms thus a strong mechanical cling between the structure and the end faces.

In another particular embodiment, the thermoplastic material of the end faces and the thermoplastic material of the matrix of the structure are compatible and each of said first and second extremities comprises at least one orifice. Thus, the structure is attached to the end faces mechanically thanks the passage of the thermoplastic material of the end faces through the at least one orifice and chemically thanks to the compatibility of the thermoplastic materials.

The second object of the invention relates to a method for assembling the plastic vehicle tank according to the invention.

The assembly of the plastic vehicle tank according to the invention is performed during Twin Sheet Blow Molding process (TSBM process). Such process is described in the patent application EP1773570B1, in the name of the applicant and which is incorporated by reference.

The invention will be better understood through the following figures which illustrate certain practical aspects of the invention. The figures are only shown as examples and do not limit the scope of the present invention.

In the description which now follows, identical reference signs denote identical components or identical features, and therefore the description given in respect of one component with reference to one figure also applies to the other figures, thus avoiding repeated description.

Figure 1:
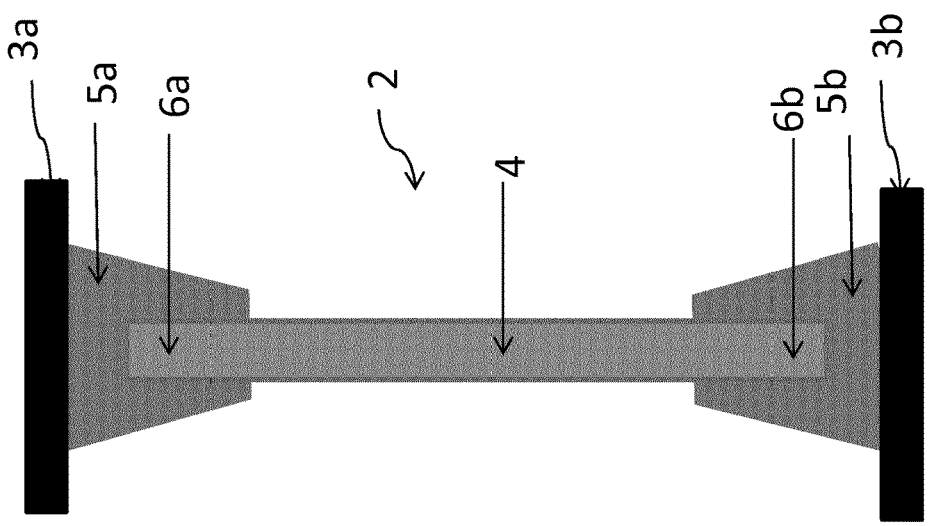
FIG. 1 illustrates a sectional view of part of a plastic vehicle tank having a connecting element in accordance with a first embodiment of the invention.

FIG. 1 illustrates a sectional view of part of a plastic vehicle tank 1 reinforced by means of one connecting element 2. The connecting element 2 is arranged between two tank walls 3a, 3b of the plastic vehicle tank 1. Here, tank wall 3a is designed as an upper wall and tank wall 3b is designed as a lower wall of the plastic vehicle tank 1.

The connecting element 2 connecting the upper wall 3a and the lower wall 3b comprises a structure 4 made of a matrix with continuous fibers embedded. The structure 4 comprises continuous fibers either oriented in one direction or in at least a first and second directions. This structure allows to the connecting element to have either by the structure of the weaving of continuous fibers or either by the orientation of the continuous fibers anisotropic mechanical properties. For example, a connecting element with most of the continuous fibers oriented in a single direction will have high resistance for a load in the direction of the fibers and a low resistance for a load in directions perpendicular to the continuous fibers.

The structure 4 of the connecting element 2 comprises a first extremity 6a and a second extremity 6b. Each of said first and second extremities 6a, 6b is encapsulated with thermoplastic material to form end faces 5a, 5b by injection moulding. The thermoplastic material used is compatible with the matrix with continuous fibers embedded of the structure. The thermoplastic material is injected locally at the extremities 6a, 6b of the structure 4 to form the end faces 5a 5b. Thus, the structure 4 extends between and connects the end faces 5a, 5b. Therefore, the thermoplastic material of the end faces 5a, 5b surrounds in an irreversible way the structure 4 by a strong chemical bonding.

The thermoplastic material of the end faces 5a, 5b and the one of the respective tanks walls 3a, 3b being chemically compatible, the end faces 5a, 5b are further welded to the respective tank walls 3a, 3b. The tank walls 3a, 3b comprises a recess (not represented) for receiving one of the end faces 5a, 5b. This recess, which can be integrally made with one of the tank walls 3a, 3b, acts as a guide member for the connecting element 2 during the assembly of the connecting member 2 into the tank 1. It helps the positioning of the end face 5a or 5b onto the wall 3a or 3b, the welding operation of the end faces 5a, 5b onto the walls 3a, 3b and therefore the assembly. With such configuration, when the plastic vehicle tank 1 is subjected to impact loading or stress, the structure 4 of the connecting element 2 serves as predetermined deformation or breaking area of the connecting element 2. That presents the advantage to not cause irreversible and serious damage to the plastic vehicle tank 1. Consequently, the walls 3a, 3b of the plastic vehicle tank can be damaged but with no leak created, and therefore operating fluid inside the plastic vehicle tank, e.g. fuel, cannot escape from the plastic vehicle tank.

Figure 2:
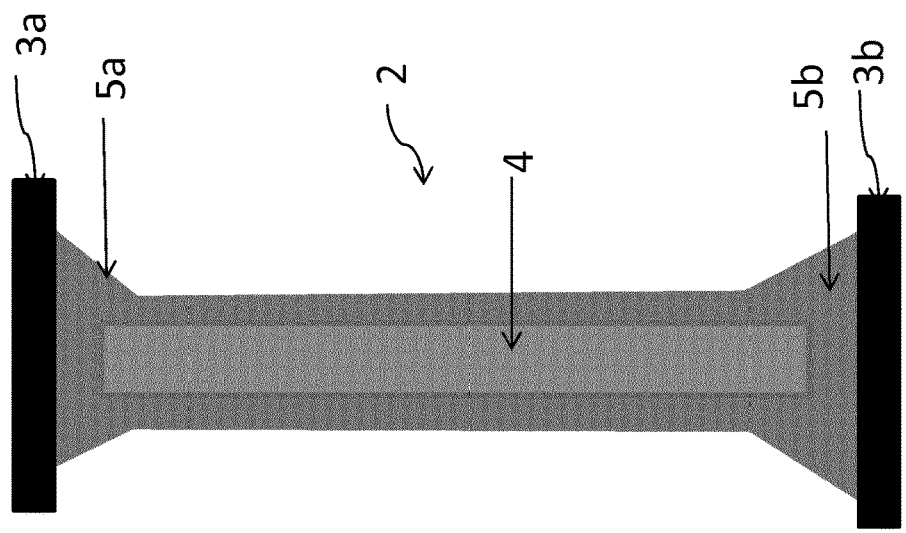
FIG. 2 illustrates a sectional view of part of a plastic vehicle tank having a connecting element in accordance with a second embodiment of the invention.

FIG. 2 illustrates a second embodiment of the plastic vehicle tank 1 according to the invention in sectional view. In this particular embodiment the plastic vehicle tank 1 differs from the plastic vehicle tank described in FIG. 1 only in that the structure 4 is completely encapsulated with the thermoplastic material of the end faces 5a, 5b along the entire length of the structure. In other words, the thermoplastic material of the end faces 5a, 5b of the connecting element 2 surrounds entirely the structure 4. That presents the advantage to avoid any risk of fiber contamination of the continuous fibers inside the tank 1.

Figure 3:
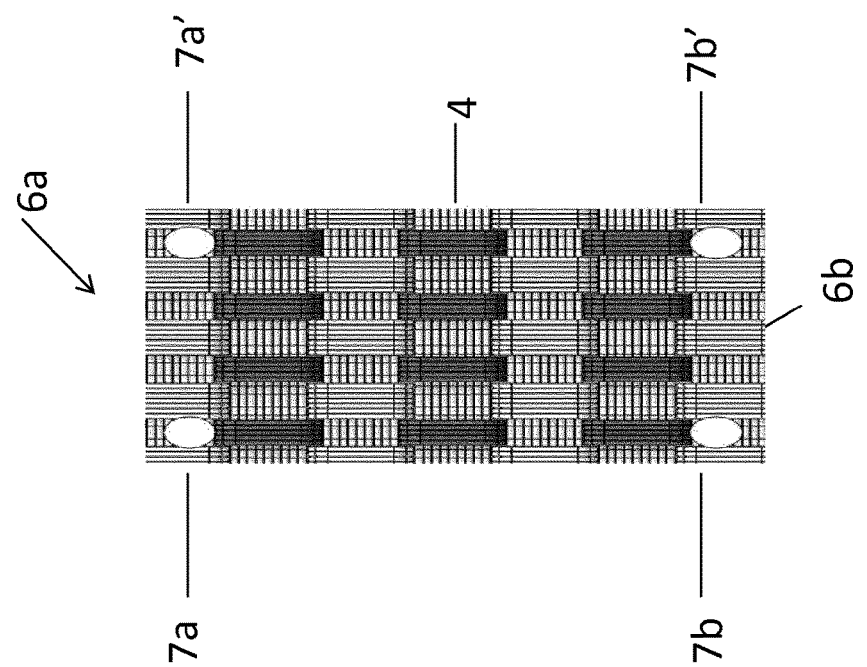
FIG. 3 illustrates schematically a view of the structure of the connecting element according one particular embodiment.

FIG. 3 illustrates schematically a view of the structure of the connecting element according one particular embodiment. In this embodiment, the structure 4 is a rectangular sheet made of a matrix with continuous fibers embedded. The matrix is a thermoplastic matrix in which are embedded either continuous fibers oriented in a single direction or in at least a first and second directions. These fibers may be based on glass, on carbon, on a polymer (such as a polyamide, for example an aromatic polyamide such as an aramid), or may even be natural fibers such as hemp or sisal. The continuous fibers of the matrix are preferably compatible with the thermoplastic matrix and therefore, generally, compatible with polyolefins and, in particular, with HDPE. In order to obtain this compatibility, the fibers may be sized (surface-treated) with a compatibilizing substance such as a silane. A reactive HDPE-type binder may also be used. Within this context, reactive functional groups of maleic anhydride type may advantageously be used. Such structure 4 has a thickness of at least 1 mm, preferably at least 1.5 mm. Such structure made of continuous fibers has a young modulus strictly greater in the direction of the continuous fibers than the young modulus of the one of any thermoplastic material such as polyethylene. Therefore, the structure is more resistant to deformation during an impact or stress than any thermoplastic material such as polyethylene.

The structure 4 of the connecting element 2 comprises a first extremity 6a and a second extremity 6b. The first extremity 6a comprises two orifices 7a, 7b and the second extremity 6b comprises two other orifices 7c, 7d. Their role is to further perform a mechanical clinging between the structure 4 and the thermoplastic material further injected to form the end faces 5a, 5b. The thermoplastic material injected passes through them 7a, 7b, 7c, 7d and connect mechanically the end faces 5A, 5b to the structure 4. The thermoplastic material used is compatible with the thermoplastic matrix with continuous fibers embedded and also with the one of the tank walls 3a, 3b.

Figure 4:
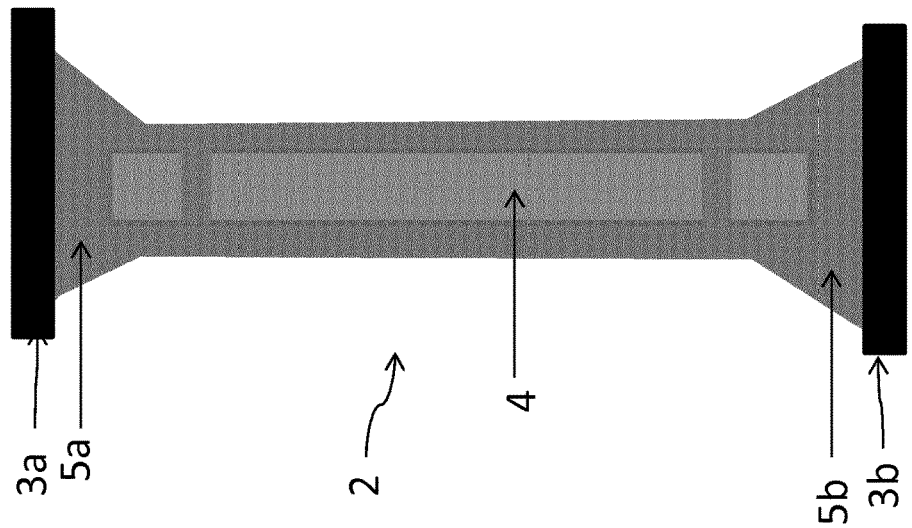
FIG. 4 illustrates a sectional view of part of a plastic vehicle tank having a connecting element in accordance with a fourth embodiment of the invention.

FIG. 4 illustrates a third embodiment of the plastic vehicle tank 1 according to the invention in sectional view. In this particular embodiment the plastic vehicle tank 1 differs from the plastic vehicle tank described in FIG. 2 in that the connecting element 2 comprises the structure 4 described in FIG. 3. The structure 4 comprises at each extremity 2 orifices (not represented), these orifices allow the thermoplastic material of the end faces passes through the orifices during injection moulding. Therefore, a mechanical connection between the structure 4 and the end faces 5a, 5b is obtained.

Figure 5:
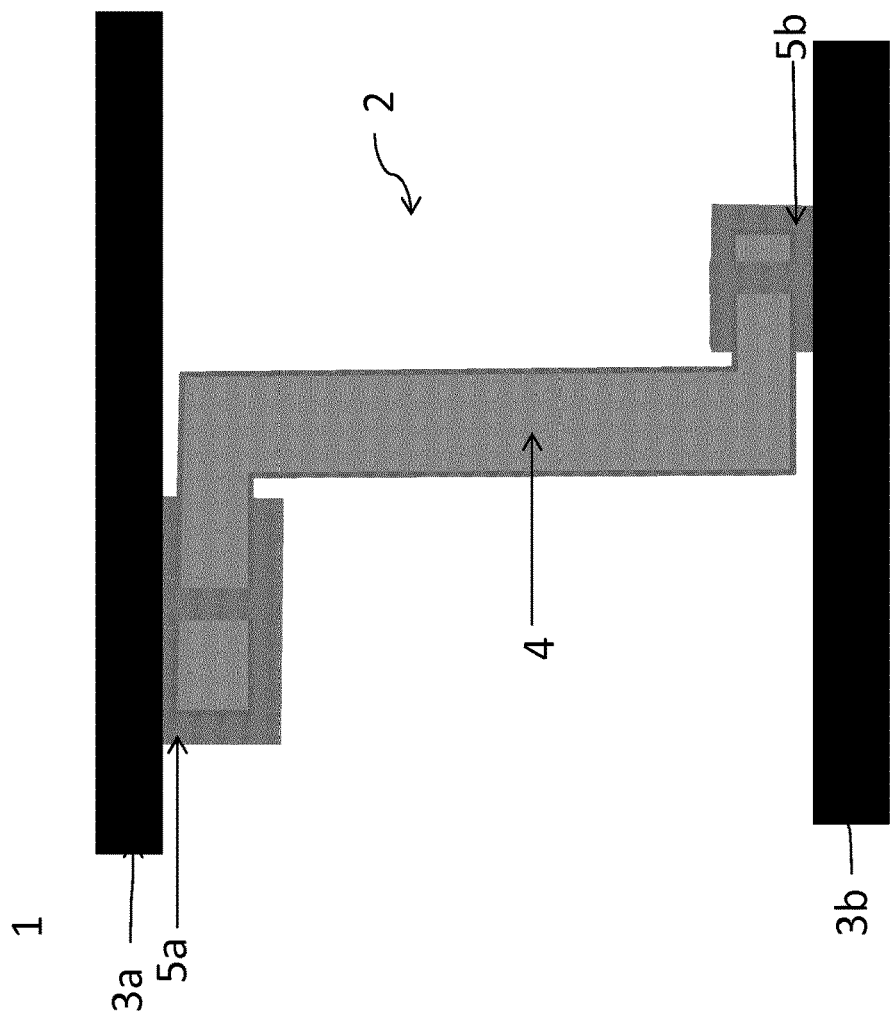
FIG. 5 illustrates a sectional view through a structure of a connecting element according to the invention.

FIG. 5 illustrates a fourth embodiment of the plastic vehicle tank 1 according to the invention in sectional view. In this particular embodiment the plastic vehicle tank 1 differs from the plastic vehicle tank described in FIG. 1 in that the structure 4 has a Z-shape profile allowing an easier integration inside the tank 1 and optimized reinforcement of the tank 1. Thus, the connecting element has a thin configuration and owing to this geometry displaces little tank with good strength. The extremities of the structure 4 comprise orifices, allowing the thermoplastic material to pass through them and to form the end faces and a strong mechanical clinging between the structure 4 and the end faces.

Figure 6:
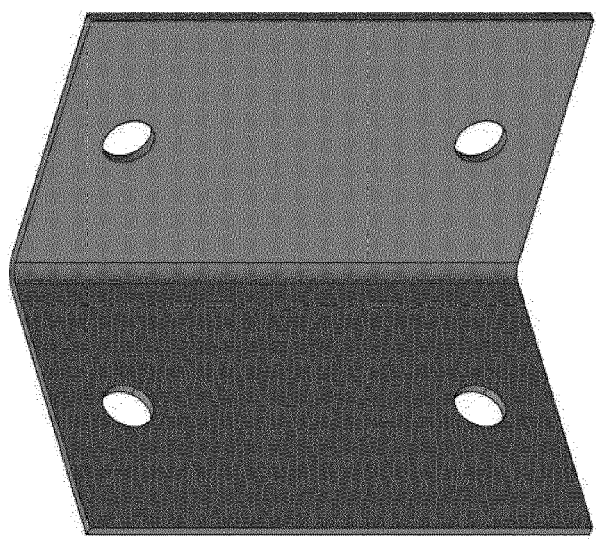
FIG. 6 illustrates schematically a view of the structure of the connecting element according one particular embodiment.

FIG. 6 illustrates schematically a view of the structure of the connecting element according another particular embodiment. In this particular embodiment the structure 4 differs from the structure described in FIG. 3 in that the structure 4 comprises one bent portion in the width of the structure. Such configuration presents the advantage that the mechanical resistance of the structure 4 is higher in case of compression and/or flexion and/or torsion) compared to a structure 4 without a bent portion described in the previous figures.

The invention claimed is:

1. A plastic vehicle tank defining an interior volume provided to contain a liquid and comprising:
   an upper wall;
   a lower wall;
   at least one connecting element joining the upper wall to the lower wall of the plastic vehicle tank, said at least one connecting element being located inside the interior volume provided to contain a liquid, and comprising a structure made of continuous fibers embedded in a matrix, and
   wherein the structure of the at least one connecting element has a tensile Young and/or a flexural modulus in at least a first direction that is 1.1 to 5 times higher than the tensile Young and/or flexural modulus of the structure in at least a second direction.

2. The plastic vehicle tank according to claim 1, wherein the matrix of the structure is in thermoplastic material.

3. The plastic vehicle tank according to claim 1, wherein the continuous fibers are glass fibers.

4. The plastic vehicle tank according to claim 1, wherein the continuous fibers of the structure are oriented in a single direction in the matrix.

5. The plastic vehicle tank according to claim 1, wherein the continuous fibers of the structure are oriented in at least a first direction and a second direction in the matrix.

6. The plastic vehicle tank according to claim 5, wherein the continuous fibers oriented in the first direction in the matrix are of the same chemical composition as the continuous fibers oriented in the second direction in the matrix.

7. The plastic vehicle tank according to claim 5, wherein the continuous fibers oriented in the first direction in the matrix are of different nature than the continuous fibers oriented in the second direction in the matrix.

8. The plastic vehicle tank according to claim 1, wherein the continuous fibers are woven.

9. The plastic vehicle tank according to claim 1, wherein the structure is made of at least two layers of continuous fibers superposed in at least one direction in the matrix.

10. The plastic vehicle tank according to claim 1, wherein the matrix of the structure is made in the same material as the plastic vehicle tank.

11. The plastic vehicle tank according to claim 1, wherein the at least one connecting element comprises spaced apart end faces, and wherein at least one of the tank walls comprises a recess for receiving one of the end faces of the connecting element.

12. The plastic vehicle tank according to claim 11, wherein the recess is integrally made with the at least one of the tank wall.

13. The plastic vehicle tank according to claim 1, wherein the at least one connecting element comprises spaced apart end faces, and wherein the structure comprises a first extremity and a second extremity, each of said first and second extremities being encapsulated within the end faces of the connecting element, preferably the end faces of the connecting element are made by injection moulding of thermoplastic material.

14. The plastic vehicle tank according to claim 13, wherein each of said first and second extremities comprises at least one orifice, wherein the end faces are made of thermoplastic material, and wherein said thermoplastic material passes through the at least one orifice.

15. The plastic vehicle tank according to claim 1, wherein said structure is encapsulated in or coated with a thermoplastic material.

16. The plastic vehicle tank according to claim 1, wherein the structure has a Z-shape profile, L-shape profile, U-shape profile, cylindrical shape profile or hemispherical shape profile.

17. The plastic vehicle tank according to claim 1, wherein the structure comprises at least one bent portion.

18. A plastic vehicle tank defining an interior volume provided to contain a liquid and comprising:
   an upper wall;
   a lower wall;
   at least one connecting element joining the upper wall to the lower wall of the plastic vehicle tank, said at least one connecting element being located inside the interior volume provided to contain a liquid, and comprising a structure made of continuous fibers embedded in a matrix, and
   wherein the continuous fibers of the structure are oriented in at least a first direction and a second direction in the matrix.

* * * * *